MAGNETIC RECORDING AND REPRODUCING

Filed March 19, 1946 3 Sheets-Sheet 1

INVENTORS
HARRY B. SHAPER
HARRY B. MILLER
BY [signature]
ATTORNEY

July 4, 1950 H. B. SHAPER ET AL 2,513,683

MAGNETIC RECORDING AND REPRODUCING

Filed March 19, 1946 3 Sheets-Sheet 2

INVENTORS

Harry B. Shaper and Harry B. Miller

BY

Pineles & Greene

Attorneys

MAGNETIC RECORDING AND REPRODUCING

Filed March 19, 1946 3 Sheets-Sheet 3

INVENTORS
Harry B. Shaper
and Harry B. Miller
BY
Pirelli & Greene
Attorneys

Patented July 4, 1950 2,513,683

UNITED STATES PATENT OFFICE 2,513,683

MAGNETIC RECORDING AND REPRODUCING

Harry B. Shaper and Harry B. Miller, Cleveland, Ohio, assignors to The Brush Development Co., Cleveland, Ohio, a corporation of Ohio Application March 19, 1946, Serial No. 655,446

1 Claim. (Cl. 171—95)

The present invention relates to improvements in apparatus for recording transient signals for later observation, and is more particularly concerned with improvements in systems in which the transient signals to be observed are recorded upon an endless recording medium by the use of a carrier wave which is frequency-modulated by the transient signals, this record being used to actuate an indicator through the intermediary of a pick-up and a frequency discriminator.

According to the present invention, improved and novel means are provided for recording just the correct interval of the transient corresponding to one complete impression upon the endless record. Also, according to the present invention, novel apparatus is provided for converting the transient signal to be recorded into the frequency-modulated signal which is directly recorded upon the endless record. As a further feature of the invention, improved and novel frequency discriminator apparatus is provided for converting the frequency-modulated signal picked up from the record into a faithful reproduction of the desired transient signal.

The various objects and advantages of the present invention will be best understood from the following description of a preferred exemplification thereof, reference being had to the accompanying drawings, wherein Fig. 1 is a schematic block diagram of the entire system of the present invention.

Figure 1:
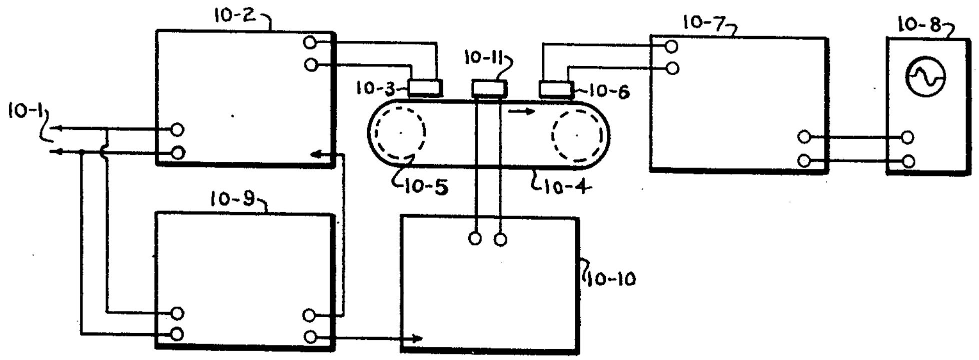

The system of the present invention is shown in Fig. 1. The transient signal is arranged to be recorded upon an endless recording medium 10—4 which is shown, by way of example, as in the form of a magnetic tape or wire which is continuously impelled to travel over two rollers 10—5 at constant speed by any suitable means, such as a synchronous motor (not shown). In this figure it is assumed that the tape is impelled in a clockwise direction, as indicated by the arrows. Mounted adjacent to and in successive operative relation with the recording medium 10—4 are a recording head 10—3, an obliterating head 10—11 and a pickup or reproducing head 10—6, the obliterating head 10—11 being placed adjacent the recording head 10—3 to act upon a portion of the tape 10—4 very soon after the record is impressed thereon, the pickup head 10—6 being spaced widely from both the other heads 10—11 and 10—3.

Coupled to the recording head 10—3 is a frequency-modulated oscillator 10—2 which, in the absence of a signal to be recorded, feeds a continuous constant-frequency carrier signal, such as of the order of 10 kilocycles per second in frequency, into the recording head 10—3, by which this constant-frequency signal is recorded upon the tape 10—4 in well-known fashion.

Coupled to the obliterating head 10—11 is an obliterating oscillator 10—10 which normally continuously supplies oscillations to the obliterating head 10—11 of a frequency suitable for obliterating the record on the tape 10—4 just previously made by the recording head 10—3. As an illustration, the obliterating frequency may be about 30 kilocycles per second. In this way the 10-kilocycle signal recorded on the tape in the absence of an input signal is continuously wiped off or obliterated from the record almost immediately.

When a signal to be recorded (such as a transient) is impressed upon the input circuit 10—1, it serves to frequency-modulate the output of oscillator 10—2 in accordance with the amplitude of the transient, so that the record impressed on the tape 10—4 by the recording head 10—3 is no longer of a constant frequency, but varies in frequency in accordance with the transient signal. At the same time, this input transient signal is supplied to a trigger control circuit 10—9 connected to the obliterating oscillator 10—10, and serves to interrupt or cut off the oscillations of the obliterating oscillator. This action is made more rapid than the time required for any particular portion of the tape to travel from the recording head to the obliterating head, so that by the time that the portion of the tape upon which is recorded the frequency-modulated signal corresponding to the transient arrives at the position of the obliterating head, that head is no longer energized, and the record is accordingly not obliterated.

The trigger control circuit 10—9 is also connected to the modulated oscillator 10—2 and acts to cut off the oscillator and thereby halt the recording operation after a time interval equal to the time taken for the tape to make one complete revolution. In this way the transient is recorded just for the interval of one rotation of the tape and no longer.

The frequency-modulated oscillations recorded on the tape are picked off by the pickup head 10—6 and are supplied to the discriminator 10—7 which converts them into a replica of the original input transient signal. Since the tape is endless and is continuously impelled, the output of the discriminator is repeated cyclically at the frequency of rotation of the tape which, for example, may be 10 cycles per second. This cyclic signal may be visually indicated by impressing it upon a pair of deflecting plates of a cathode ray indicator or oscilloscope 10—8 upon whose other deflecting plates is impressed a ten-cycle synchonized time-sweep. In this manner the transient signal is reproduced as a stationary indication upon the screen of the oscilloscope.

Figure 2:
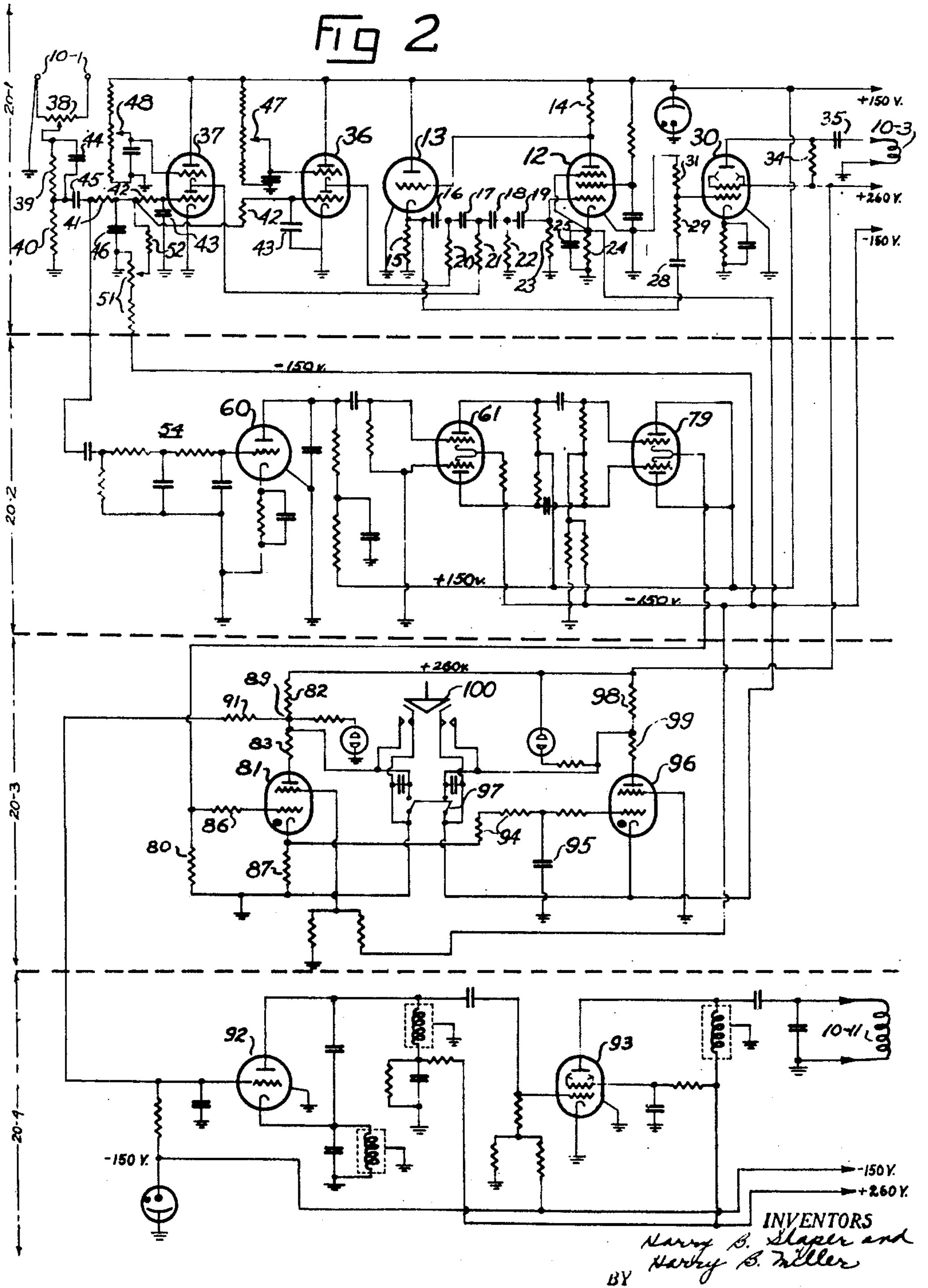
Fig. 2 is a schematic wiring diagram of the modulated oscillator, trigger control circuit and obliterating oscillator of Fig. 1.

The specific details of one form of transient-recording circuit exemplifying the invention are shown in Fig. 2, wherein the circuit is subdivided by three horizontal dashed lines into four sections: namely, section 20—1 comprising the elements of the frequency-modulated oscillator 10—2; section 20—2 comprising the amplifier and rectifier stages of the trigger control circuit 10—9; section 20—3 comprising the trigger stages of circuit 10—9; and section 20—4 comprising the elements of the obliterating oscillator 10—10.

The frequency-modulated oscillator section 20—1 includes the tubes 12 and 13 forming the oscillator. Tube 13 has a cathode resistor 15 and acts as a cathode follower, its cathode being connected to the control grid of tube 12 through a phase-shifting circuit or network comprising series-connected capacitors 16, 17, 18, 19 and shunt-connected resistors 20, 21, 22 and 23. Tube 12 has a plate resistor 14, and its anode is connected to the control grid of the tube 13. Tube 12 also has a cathode resistor 24 shunted by a by-pass capacitor 25. Tubes 13 and 12 therefore form a phase-shift oscillator whose frequency is determined by the phase delay in the capacitor-resistor network 16—23. The alternating component of the voltage appearing across the cathode-follower resistor 15 is supplied to the input of an amplifier or power output tube 30 through coupling capacitor 28 and a voltage-dividing circuit comprising resistors 29 and 31. The output of power tube 30 appearing across its plate resistor 34 is supplied to the recording head 10—3 through a coupling capacitor 35.

In such an oscillator, oscillations are generated at the frequency at which the capacitor-resistor network provides a phase delay of 180°. If the values of capacitance or resistance are varied so as to tend to change this phase delay, the frequency of the oscillator will correspondingly vary to restore the phase delay to 180° at the new frequency. Accordingly, by controlling the resistance values in accordance with a modulating signal, frequency modulation of the output of the oscillator can be obtained. In the present system, tubes 37 and 36 provide such control.

Each of these tubes 36 and 37 acts as a variable resistance in series with the respective resistors 20 and 21. Referring specifically to tube 36, it will be seen that this tube is a double triode having two cathode-anode paths in series. The resistor 20 is connected to ground through the lower triode section, and the control grid of this triode section is supplied in the manner described below with the modulating signal. The control grid of the upper triode section is maintained at a fixed potential by means of voltage divider 48. In this manner the resistance in series with resistor 20 is directly controlled by the modulating signal while maintaining fixed potential upon the plate of the lower triode section, which is connected directly to resistor 20. Tube 37 has exactly the same circuit as tube 36, and operates in the same manner.

The transient signal to be recorded is supplied to the input terminals 10—1 and thereby to the voltage divider 38 which permits adjustment of the amplitude of the modulating signal applied to the control tubes 36 and 37. The bias for these tubes is supplied from a voltage divider 51 through a coupling resistor 52. The signal derived from voltage divider 38 is fed to the lower grids of tubes 36 and 37 through several resistor-capacitor networks.

The first network defined by resistors 39, 40 and capacitors 44 and 45 serves to give frequency compensation for the remaining portions of the system. This network, together with the network formed by resistor 41 and capacitor 46, are designed as a filter, which prevents oscillator frequency energy from being impressed upon the control grids of the control tubes 36 and 37, without materially impeding the passage of signals whose frequency is lower than that of the oscillator frequency. This is necessary, since any oscillator frequency energy inserted into the phase-shift network 16—23 would disrupt the desired linear relation between output frequency and input modulating signal.

Where, as here, two or more separate branches of the phase-shift network have their resistances varied by means of control tubes with their control grids excited in parallel by the same modulating signal, it is also necessary to decouple these control grids with respect to oscillator frequencies, since the several control tubes operate in branches of the phase-shift network which have different amplitudes and phases. Thus, any coupling which would occur between the various control grids of the control tubes would tend to upset the oscillation frequencies and their linear relationship to the modulating voltages. This decoupling is produced by the resistors 42 and capacitors 43, which eliminate oscillation frequency energy from the control grids of the two control tubes and thereby decouple these grids from one another at the oscillator frequencies.

In Figure 2 only two resistance legs of the phase-shift network are shown controlled by control tubes. However, all four of these resistance legs, or more, should more legs be used, may be arranged to be controlled by similar control tubes, where, for example, wider swings of oscillator frequency are required.

In operation, in the absence of input modulating signals, the oscillator 12, 13 continuously supplies energy of its mean or carrier frequency to the recording head 10—3. As discussed above, these oscillations are recorded upon the tape 10—4, but are almost immediately obliterated by the obliterating head 10—11. The obliterating oscillator 10—10, which supplies the excitation for the obliterating head, is shown in section 20—4 of Figure 2 and comprises an oscillator tube 92 coupled to a power amplifier 93, which, in turn, is coupled to the obliterating head 10—11. The bias on the grid of the obliterating oscillator tube 92 is controlled in the manner described below, so that the obliterating oscillations may be cut off under proper conditions.

As is discussed above, the present system operates to control the obliterating oscillator to cut out its obliterating action immediately upon commencement of recording of an input transient signal. It also stops the recording action after one complete rotation of the tape subsequent to the initiation of recording of a transient signal. These functions are performed by the circuits shown in sections 20—2 and 20—3 of Figure 2. Section 20—2 essentially comprises an amplifier and rectifier for the input transient signal. Thus, the transient signal is conducted from the input circuit 10—1 through the compensating circuit 39, 40, 44, 45 to the control grid of an amplifier tube 60 by way of a resistor-capacitor network 54. This network 54 forms a low-pass filter circuit, preventing any very high frequency components in the transient input signal from being supplied to tube 60. This assures that the trigger amplifier 60 will respond only to desired signals.

The output of the amplifier tube 60 is applied to a phase-inverting amplifier 61. Phase inverter 61 has its output connected to the balanced rectifier stage 79 serving as a full-wave rectifier and having a single load resistor 80.

In the balanced rectifier 79, when either control grid is supplied with a positive signal, an output voltage appears across the load resistor 80. In this way the circuit 20—2 responds to the input transient signal to provide a positive voltage across resistor 80 no matter what polarity the input signal may have.

The trigger circuit shown in section 20—3 comprises a grid-controlled gaseous rectifier 81, such as of the "Thyratron" type. The plate of the tube 81 is connected to a source of positive potential through resistors 82, 83, and its cathode is connected to ground through resistor 87.

The normal potentials upon the electrodes of tube 81 are adjusted so that the tube is normally non-conductive. However, when a sufficient positive voltage is impressed upon the control grid by resistor 80 in response to the input transient signal, tube 81 becomes suddenly conductive. When this happens, the potential of the junction 89 of resistors 82, 83 is suddenly lowered. This junction 89 is connected through a resistor 91 to the control grid of the obliterating oscillator 93. Accordingly, the bias of the obliterating oscillator control grid is thereby reduced to the point that the obliterating oscillator is cut off, and obliterating action is halted.

The circuits are designed so that the cutting off of the obliterating oscillator occurs in less time than that required for a particular element of the tape to travel from the recording head to the obliterating head. In this way, obliterating action is halted, as required for proper recording of the desired transient signal.

When tube 81 becomes conductive, the potential of its cathode rises suddenly, becoming positive. This positive potential is supplied to the control grid of a similar grid-controlled gaseous rectifier 96 through a time-delay circuit composed of resistors 94 and capacitor 95. The time delay interposed by this resistor capacitor network 94, 95 is selected to be substantially equal to or slightly less than the time required for an element of the tape to make one complete rotation around the loop of the tape.

The plate of gas tube 96 is connected to the positive potential source through resistors 98, 99. Its cathode is connected to the cathode of the modulated oscillator tube 12, and thence to ground through the resistor 24. Thus, when tube 96 becomes suddenly conductive, after the tape has been completely recorded upon, the current through resistor 24 abruptly rises. This increases the negative bias upon the control grid of oscillator tube 12 and cuts off the oscillator, whereby oscillations are no longer supplied to the recording head 10—3. Thereafter, the recording tape may be continuously rotated, and only the pickup head is effective, so that the transient signal recorded during the single rotation of the tape may be viewed upon the oscilloscope or other indicator in a synchronous manner, as described above.

When the two gas tubes 81 and 96 have become conducting, they remain in that state and keep both the modulating oscillator and the obliterating oscillator cut off until reset by actuation of the pushbutton switch 100. When this switch is momentarily depressed, the tubes 81 and 96 are short-circuited. Consequently, current ceases to flow between the cathodes and anodes thereof, permitting the control grids to resume control. If these control grids are sufficiently negative, as in the absence of an input transient signal, they will regain control, and the tubes 81 and 96 will remain blocked or non-conducting.

Under some circumstances it may be desirable to maintain the modulated oscillator and obliterating oscillator continuously cut off. This may be done by the switch 97 which, when closed, provides a permanent current path in parallel with the tubes 81 and 96, and thereby cuts off the two oscillators in the same manner as do tubes 86 and 91 when conducting.

Figure 3:
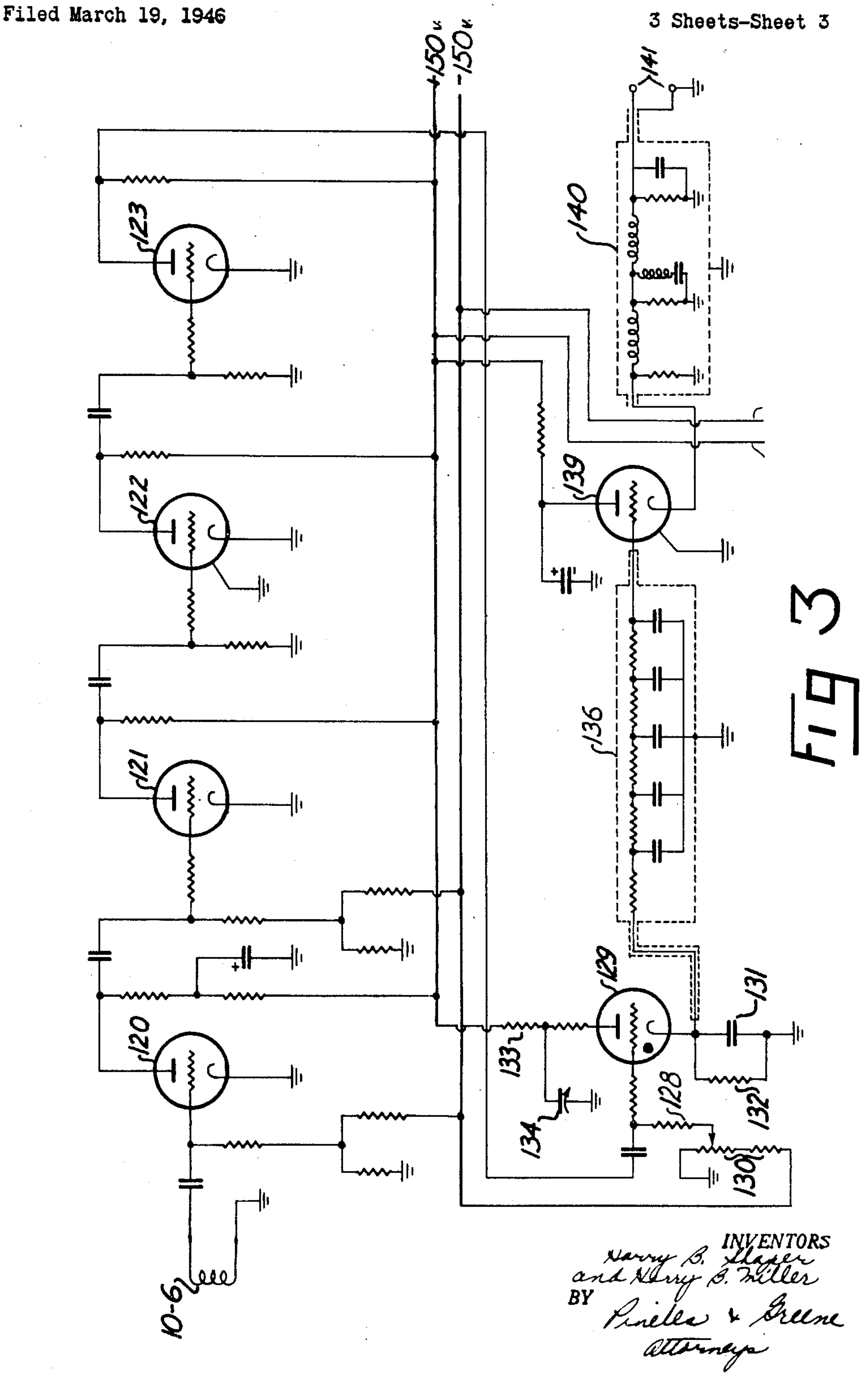
Fig. 3 is a similar wiring diagram of the discriminator of Fig. 1.

The circuit of the pickup head 10—6 is shown in Figure 3. The signal induced in the pickup head by the record on the tape is supplied successively through the four limiter amplifiers 120, 121, 122 and 123. Tubes 120 and 121 are class C amplifiers, and suppress weak signals. This produces a clean base line in the oscilloscope image of the portion of the tape where the carrier frequency record was obliterated. Tubes 122 and 123 act as overloaded amplifiers and clip off and square the tops and bottoms of the alternations of the frequency-modulated signal. The output derived from tube 123 is therefore essentially a frequency-modulated square wave. This square wave is supplied to a differentiating circuit consisting of capacitor 127 and resistor 128 which converts the square wave into a succession of positive and negative pulses, each positive or negative pulse corresponding to the vertical increasing or decreasing part of the square wave. The time interval between these derived pulses will then vary in accordance with the original modulating signal controlling the frequency of the modulated oscillator.

These pulses are then supplied to the control grid of another grid-controlled gaseous rectifier tube 129, serving as a frequency discriminator. This tube 129 is biased to cut-off by voltage divider 130. The plate of tube 129 is connected to a source of positive potential through resistors 133 and 135. The junction of resistors 133 and 135 is then connected to ground through a capacitor 134. The cathode of tube 129 is connected to ground through a capacitor 131 shunted by a resistor 132.

In the absence of input pulses to the grid of tube 129, it remains non-conductive by virtue of the bias on the grid. Under these circumstances the capacitor 134 is charged to the full voltage of the positive supply source. When a positive pulse is impressed on the control grid of tube 129, tube 129 becomes conducting, and capacitor 134 substantially completely discharges into the capacitor 131, which has a much larger capacitance. During this discharge interval, substantially no energy is supplied to capacitor 131 from the positive supply source, since the resistor 133 is designed to have a large value of resistance.

As soon as capacitor 134 is substantially completely discharged, the current through tube 129 decreases to such a low value that its grid resumes control, and the tube is again blocked, whereupon capacitor 134 is again charged to the full positive potential of the source before the next positive pulse arrives. Capacitor 131 accumulates this charging for a time long compared to the period of the modulated carrier, by virtue of the time constant of capacitor 131 and its shunt resistor 132. Each of the pulses of current supplied to capacitor 131 by the discharge of capacitor 134 is therefore of the same magnitude and duration, determined by the capacitance of capacitor 134 and the voltage to which it is charged, and hence all such pulses have the same charge or integral of current. Accordingly, the average voltage assumed by capacitor 131 will depend upon the number of such equal energy pulses supplied to it per unit time. This number of pulses per unit time, of course, depends on the number of positive pulses produced by the differentiating circuit 127, 128, which, in turn, corresponds exactly to the frequency modulation impressed on the modulated oscillator carrier, which corresponds to the transient modulating signal. Thus, the average energy supplied to the capacitor 131 will correspond to the transient modulating signal.

In this way the voltage appearing across capacitor 131 is a faithful reproduction of the transient signal applied to the input circuit for the recording head. It will therefore be clear that the circuit of tube 129 provides a simple and efficient discriminator arrangement for obtaining the modulating signal of a frequency-modulated wave.

The output of tube 129, derived as the voltage across capacitor 131, is supplied through a filter 136 to a cathode-follower amplifier circuit 139 and thence through a subsequent filter 140 to output terminals 141, which may be connected to the deflecting arrangement of the oscilloscope. The filters 136 and 140 are selected to remove any undesired frequency components of the signal, such as components of the frequency of the modulated oscillator, which might otherwise appear in the circuit.

The discriminator arrangement just described is particularly useful where the modulating frequency is relatively low, such as of the order of ten kilocycles per second or less.

Figure 4:
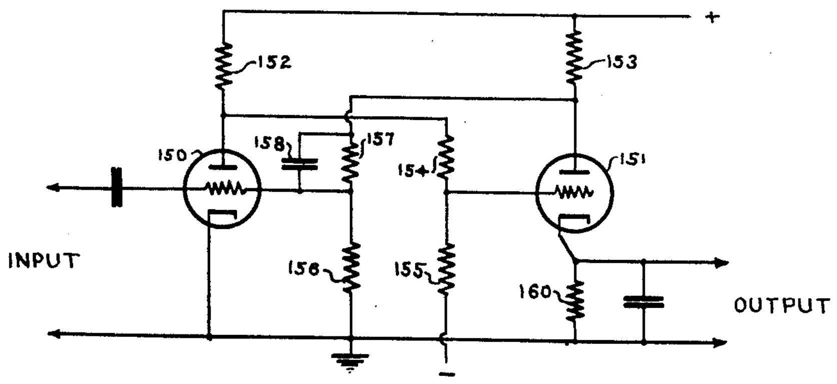
Fig. 4 is a similar wiring diagram of a modified discriminator circuit useful in place of that of Fig. 3.

For higher frequencies, the discriminator circuit shown in Figure 4 becomes very useful. This discriminator is essentially a self-recovering trigger circuit. The circuit consists of a first tube 150 having a load resistor 152 which is connected to the control grid of a second tube 151 through the resistor 154, which control grid is also connected to a source of negative potential through the resistor 155. The plate of tube 151 is connected to positive potential through the plate resistor 153 and also to the control grid of tube 150 through the parallel-connected resistor and capacitor 157, 158. The grid of tube 150 is also connected to its cathode through a resistor 156. The input is supplied between the control grid of tube 150 and its cathode through a coupling capacitor 159. The output is derived as the voltage across a resistor 160 connecting a cathode of tube 151 to ground.

In the steady state or quiescent condition, the grid of tube 150 is positive and the tube is conducting. Tube 151 is thereby rendered non-conducting by the drop in potential produced by the current through plate resistor 152 of tube 150. This quiescent condition is not disturbed by any positive pulse impressed on the grid of tube 150, since this tube is already conducting. However, if a negative pulse is impressed upon the grid of tube 150, this tube becomes less conducting, which, in turn, decreases the negative bias on the control grid of tube 151, and tube 151 becomes more conducting.

In the quiescent condition capacitor 158 is charged substantially to the full potential of the positive source. When tube 151 becomes conducting, capacitor 158 discharges through resistors 156, 160, and the tube 151. As this capacitor 158 discharges, the grid potential of tube 150 rises, and a point is reached where tube 150 begins to conduct again. When tube 150 begins to conduct, the grid of tube 151 is made more negative, and tube 151 is thereby cut off, restoring the system to the quiescent state. During the time that tube 151 was conducting, a definite voltage pulse appeared across the cathode resistor 160 which lasted for a definite length of time determined by the time constant of the circuit 157, 158.

Thus, for every negative pulse (of whatever shape) impressed upon the input of tube 150, a rectangular pulse of current is passed through resistor 160. The voltage across resistor 160 may then be applied to a suitable averaging circuit similar to capacitor 131 of Figure 3, whose output will then follow the frequency of the input pulses. Accordingly, this discriminator will operate essentially in the same manner as that of Figure 3, to provide an output signal corresponding to the modulating signal impressed upon the modulated oscillator.

Since the discriminator of Figure 4 employs vacuum tubes, it does not suffer from difficulties caused by the fixed deionization time of gaseous tubes, such as used in Figure 3, so that the circuit of Figure 4 is applicable to use with much higher frequencies than that of Figure 3.

Although the principles of the present invention have been described above as applied to one particular type of recording, they are obviously also applicable to many other types of recording, such as longitudinal magnetic recording, perpendicular magnetic recording, transverse magnetic recording, or the like.

It will be apparent to those skilled in the art that the novel principles of the invention disclosed here, in connection with specific exemplifications thereof, will suggest various other modifications and examples of the same. It is accordingly desired that, in construing the breadth of the appended claim, it shall not be limited to the specific exemplifications of the invention described herein.

What is claimed as the invention is:

In an apparatus for recording and reproducing a transient signal: an endless magnetizable record medium, means for driving said record medium around a continuous loop at a given speed, recording head means in operative relation to said record medium for recording magnetic signals on moving portions of said record medium, a recording circuit including an oscillator connected to said recording head for supplying thereto mean-frequency oscillations in the absence of a transient signal to be recorded whereby said oscillations are continuously recorded upon said medium, means connected to said oscillator for frequency modulating said oscillations in accordance with the transient to be recorded, a reproducing head in operative relation to said record medium for reproducing the signals recorded thereon, reproducing circuit means connected to said reproducing head and including means for amplifying and squaring said reproduced signals, said reproducing circuit means including means for differentiating said amplified and squared signal to establish a series of positive and negative pulses with time intervals between them which vary in accordance with the original modulating transient signal, frequency discriminator means connected to said differentiating means, and means for viewing said reproduced transient signal connected to said frequency discriminator means.

HARRY B. SHAPER.
HARRY B. MILLER.

REFERENCES CITED

The following references are of record in the file of this patent:

UNITED STATES PATENTS

| Number | Name | Date |
|---|---|---|
| 2,262,407 | Rath | Nov. 11, 1941 |
| 2,334,726 | Rankin | Nov. 23, 1943 |
| 2,343,099 | Usselman | Feb. 29, 1944 |
| 2,370,133 | Begun | Feb. 27, 1945 |
| 2,378,383 | Arndt | June 19, 1945 |
| 2,378,388 | Begun | June 19, 1945 |
| 2,409,577 | Matson | Oct. 15, 1946 |
| 2,424,218 | Begun | July 22, 1947 |